May 6, 1930.   A. B. BOWMAN   1,757,356
DISH AND UTENSIL WASHING MACHINE
Filed Aug. 26, 1924
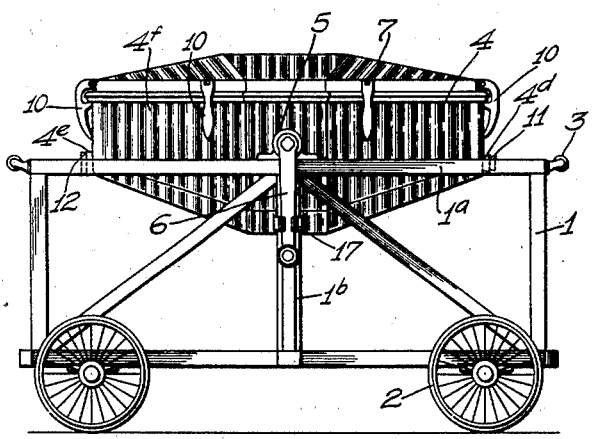
FIG. 1.
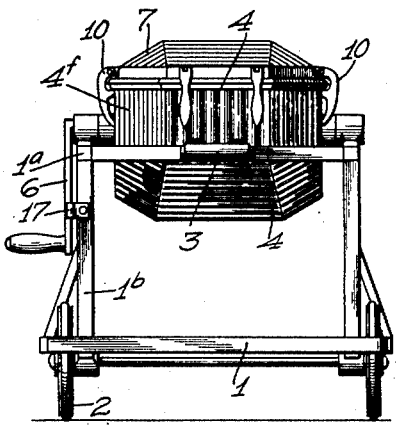
FIG. 2.
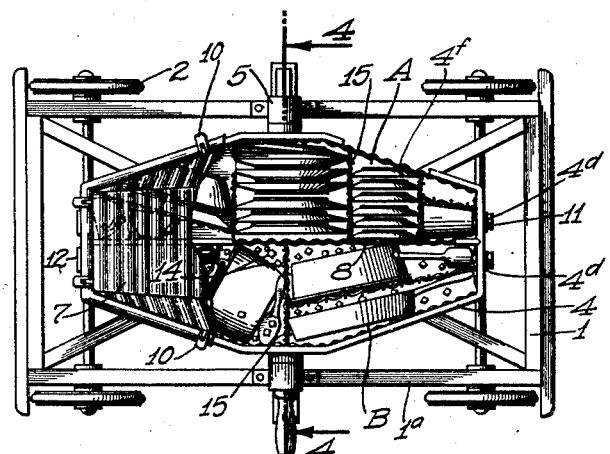
FIG. 3.
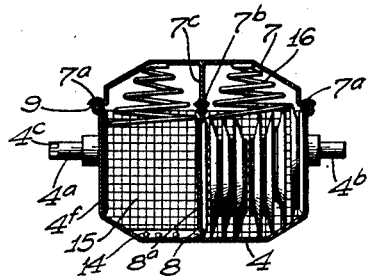
FIG. 4.
FIG. 5.
FIG. 6.
Abram B. Bowman
INVENTOR Patented May 6, 1930

1,757,356

UNITED STATES PATENT OFFICE

ABRAM B. BOWMAN, OF SAN DIEGO, CALIFORNIA

DISH AND UTENSIL WASHING MACHINE

Application filed August 26, 1924. Serial No. 734,230.

My invention relates to a machine for washing dishes, cooking utensils, knives and forks, glasses and all classes of dishes and cooking utensils and the objects of my invention are: First, to provide a dish-washing machine with a receptacle provided with separate water tight compartments for washing the different classes of dishes, one compartment for the ordinary table dishes and the other for the cooking utensils and the like and which machine will efficiently wash both classes of dishes with one and the same operation; second, to provide a machine of this class in which the dishes and utensils may be washed, rinsed, and dried without removing the dishes therefrom until they are ready for use; third, to provide a machine of this class which in its preferred form is portable and may be readily moved about the room or from one room to another so that the machine may be moved to the table and the soiled dishes transferred directly from the table to the machine, then the machine moved to the stove or sink and the cooking utensils transferred directly to the machine and the dishes washed, rinsed and allowed to dry and may stand in the machine until ready for use again then the machine moved to the table or stove and the dishes or utensils removed for use directly to the stove or table from the machine; fourth, to provide a machine of this class including a receptacle in which the dishes are placed and washed by vigorous splashing of the water and movement of the water in the vessel in all directions, mainly however from one end thereof to the other caused by the rotation of the receptacle; fifth, to provide a receptacle with relatively long, narrow compartments for receiving and washing dishes which is rotatably mounted intermediate its end on a horizontal axis and which is provided with corrugated walls and which by reason of its rotatable movement, shape and form and corrugated walls causes vigorous splashing of the water in all directions from one end of the compartment to the other, sideways and in all directions through and between the dishes contained therein; sixth, to provide a machine of this class which is provided with separate compartments for china, glassware and silver and the other for cooking utensils and the like, each of which compartments may be divided up as desired by partitions fitting into corrugations in the walls of the compartments; seventh, to provide a dish-washing machine having a dish receptacle provided with compartments separated by corrugated wire netting partitions mounted in corrugated members of the compartment walls so that the partitions may be positioned for varying sized dishes throughout the compartment for spacing the dishes from each other within the compartment as desired; eighth, to provide novel means for securing the dishes in position when rotating the receptacle and preventing their lateral movement with the complete rotation of the receptacle; ninth, to provide novel means for scouring cooking dishes in a machine of this class; tenth, to provide a machine of this class with means in connection with the dishes for engaging the dishes in addition to the water, to provide a scouring and cleaning action other than the water on said dishes and utensils; eleventh, to provide a dish-washing machine of this class which is so constructed that the walls thereof provide means for throwing the water inwardly from the walls on the opposite sides of the compartment as it moves endways in the compartment and also forms means for supporting corrugated partitions placed diagonally or laterally in said compartments for supporting differently shaped dishes or cooking utensils; twelfth, to provide a machine of this class which is so constructed that motor power may be readily applied to the same so that the machine may be operated either by hand or by motor as desired; thirteenth, to provide as a whole a novelly constructed combined dish and cooking utensil washing machine and fourteenth, to provide a machine of this class which is simple and economical of construction, light, durable, efficient, easy to operate, which may be easily filled with water and from which water may be easily discharged and a machine in which all the articles used in the household may be readily and thoroughly washed, rinsed and dried and transported to the place where they are to be used, which machine will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a side elevational view of my dish-washing machine; Fig. 2 is an end elevational view thereof; Fig. 3 is a plan view thereof, with a portion of the dish receptacle and other parts and portions partly broken away and in section to facilitate the illustration; Fig. 4 is a transverse sectional view of the receptacle with the section taken through 4—4 of Fig. 3; Fig. 5 is an enlarged detailed sectional view of the water inlet and outlet showing the screen over the inlet or outlet and Fig. 6 is a fragmentary plan view of a modified form of construction of the receptacle Like characters of reference refer to similar parts and portions throughout the several views of the drawings.

The supporting frame 1, wheels 2, handles 3, dish receptacle 4, journal members 5, crank 6, cover 7, partition 8, gasket 9, clamp members 10, stoppers 11 and 12, screens 13, scrubbing members 14, corrugated foraminous partitions 15, dish supporting springs 16, and the latch members 17, constitute the principal parts and portions of my dish-washing machine in its preferred form of construction.

My dish-washing machine consists of a supporting frame, a dish receptacle rotatably mounted thereon and a means for rotating the receptacle about its pivotal mounting. The supporting frame 1, when the machine is used as a portable machine, is built in the form of a carriage and is supported on wheels 2 for readily conveying the machine from one place to another, and is provided at the upper portions of its ends with handles 3. The frame 1 is preferably rectangular in shape and open at its middle portion, the frame serving substantially as a supporting means and a guard for the receptacle.

The receptacle 4 is of relatively long construction and is provided at its side and intermediate its ends with bearing portions $4^a$ and $4^b$, which are rotatably mounted in journal members 5, preferably secured to the upper side members $1^a$ of the frame 1. The one bearing portion $4^a$ of the receptacle 4 is preferably provided with a polygonally shaped end $4^c$ to which is secured a crank member 6 for rotating the receptacle, when the machine is adapted to be hand-operated.

The middle portions of the side and bottom walls of the receptacle 4 are preferably made parallel with the longitudinal axis thereof, and the other portions of the side and bottom walls extending outwardly from the middle portion thereof converge inwardly towards the ends of the receptacle forming angles with the axis thereof. The end walls of the receptacle are made substantially flat, except for corrugations as will be described hereafter, and perpendicular to the longitudinal axis of the receptacle. A vertical water tight partition 8 is provided at the middle portion of the receptacle, which wall extends from one end thereof to the other dividing the receptacle into two compartments, the one being adapted to receive and wash china, glass, silver or other similar ware, while the other is adapted to receive and wash cooking dishes and utensils. Over the open side of the receptacle is adapted to be secured a cover 7, shaped similarly to but of less depth than the receptacle 4. The normally upper edges of the side walls of the receptacle 4 and the normally upper edge of the partition 8 are preferably rolled and reinforced forming seats over which conforming recess portions $7^a$ surrounding the outer edge of the cover 7 and a recess portion $7^b$ at the lower edge of the longitudinal partition wall $7^c$ of the cover are adapted to be positioned. Within the recess portions $7^a$ and $7^b$ of the cover are positioned gaskets 9 which are adapted to bear against the upper sides of the rolled edges of the receptacle 4 and the partition 8, thus forming two separate water tight compartments A and B. Near the edges of the cover 7 are hinged a plurality of clasp members which are adapted, when in a securing position, to engage the under sides of the rolled edges of the receptacle for securing the cover tightly thereon.

In the opposite end walls of the separate compartments A and B are provided upper openings $4^d$ and $4^e$ in which are adapted to be positioned, respectively, stoppers 11 and 12, the latter openings $4^e$ being larger than the former and adapted to fill the receptacle with water and discharge the water therefrom. At the inside of the receptacle and over the openings $4^d$ and $4^e$ are secured screens 13 of relatively large mesh or bars to prevent the scouring members 14 or other small articles in the receptacle from passing through the openings. The openings $4^d$ are for the purpose of providing a vent to permit the steam or vapor to pass out when the dishes or utensils are drying.

All of the walls of the receptacle and cover and the partition 8, are provided with a plurality of substantially uniformly spaced pocket portions or corrugations $4^f$ and $8^a$, respectively. Into these pocket portions or corrugations are adapted to be positioned the edges of dishes for spacing the same from each other within the receptacle during the process of washing. These pockets or corrugations are also and primarily adapted for receiving the side edges of foraminous or wire mesh partitions 15 to subdivide the separate compartments A and B into smaller intercommunicating compartments. These partitions 15 are also provided with pocket portions or corrugations which are vertically positioned and uniformly spaced from each other for spacing dishes from each other therebetween, substantially as illustrated in Fig. 3 of the drawings. The pockets or corrugations in the partitions are also adapted to support other partitions therebetween or between the same and the pocketed or corrugated portions in the side walls of the receptacles.

To retain the dishes in position in the receptacle when rotating the same, I have provided large spiral springs secured on the inside of the cover for performing this function, the springs bearing against the upwardly extending portions of the dishes when the cover is in place, but sufficiently resilient to avoid breakage of the dishes.

It will be here noted that the shape of the receptacle and the corrugated side walls thereof and the corrugated partition 8 perform the very important function of diverting the water directed against the same inwardly therefrom, thus tending to keep the water away from the side walls and partitions and directing the same between the dishes where most needed.

The scrubbing members 14, mentioned above, are preferably only placed in the compartment adapted to wash the cooking dishes and utensils and consist preferably of cube-shaped and preferably non-abrasive members, such as soft or hard rubber, and of such size as to be easily moved about in the receptacle while the water splashes to and fro therein, thus facilitating the washing action of the water. The screens over the openings in the receptacle are of such mesh as to prevent the scrubbing members 14 to be discharged with the water when emptying the same from the receptacle.

When positioning the dishes within the receptacle, the same is held in a horizontal position, as shown in the drawings, there being provided a pivotal latch member 17 on one of the middle frame members 1$^b$ which is adapted to be rotated in such a manner as to engage the crank member 6 for holding the receptacle in said horizontal position. After the dishes are placed in the desired position, the cover 7 is clamped over the top thereof; the crank member 6 is then released from engagement with the latch member 17 and the receptacle rotated to a vertical or substantially vertical position so that the opening is on top; the compartments A and B are then partly filled with hot water and the necessary amount of washing powder or soap,—it will be here noted that very hot water may be used thus completely sterilizing the dishes and utensils; the stoppers 12 are then inserted in the openings 4$^e$ and the receptacle rotated a sufficient number of times to clean the dishes and utensils by means of the crank 6. The water is then drained from the receptacle by removing the stoppers 12 after rotating the receptacle to a vertical position with the openings 4$^e$ downwardly; the compartments in the receptacle are then filled with fresh hot water. The stoppers 12 are again inserted into the openings and the receptacle is again rotated a number of times to wash the soapy water and other residue from the dishes; the rinse water is then drained by rotating the receptacle to a vertical position, as previously stated; the stoppers 11 are then removed to permit free circulation of air through the receptacle and to permit the steam to escape, thus drying the dishes. The dishes may be kept in the receptacle in this manner until ready for use.

In the modified form of construction, as shown in Fig. 6 of the drawings, the walls of the receptacle are plain and the pocket or corrugated means for positioning the dishes in the receptacle or the partitions, is provided by placing in the separate compartments of the receptacle similarly shaped corrugated wire mesh receptacles or baskets 18.

It is obvious from this construction, as illustrated in the drawings and disclosed in the foregoing specification, that there is provided a novel and efficient dish-washing machine as intended and as set forth in the objects of the invention, and though I have shown and described a particular construction, combination and arrangement of parts and portions and a certain modification thereof, I do not wish to be limited to this particular construction, combination and arrangement nor to the modification, but desire to include in the scope of my invention the construction, combination and arrangement substantially as set forth in the appended claims.

Having thus described my invention, what I claim as new and desire to secure by Letters Patent is:

1. In a dish and cooking utensil washing machine, a supporting frame and a relatively long, narrow dish supporting receptacle rotatably mounted thereon on a horizontal axis, said axis extending transversely to the longitudinal axis of said receptacle, said receptacle being provided with a substantially vertical, water tight partition wall positioned perpendicular to the axis of rotation within the receptacle providing separate longitudinal water tight compartments therein.

2. In a dish and cooking utensil washing machine, a supporting frame and a relatively long, narrow dish supporting receptacle rotatably mounted thereon on a horizontal axis, said axis extending transversely to the longitudinal axis of said receptacle, said receptacle being provided with a corrugated vertical water tight partition wall positioned perpendicular to the axis of rotation within the receptacle providing separate, water tight compartments therein, the wall of said receptacle being covered with vertically extending corrugations.

3. In a dish-washing machine, a supporting frame, a dish supporting receptacle rotatably mounted thereon on a horizontal axis, said axis extending transversely to the longitudinal axis of said receptacle, said receptacle being provided at the inside of its side walls with vertically extending corrugations, and a plurality of separate, removable, yieldable, foraminous, corrugated partitions positioned within said receptacle and retained in position by means of the vertically extending corrugations therein.

4. In a dish and cooking utensil washing machine, a supporting frame, and a long receptacle mounted intermediate its ends on a horizontal axis on said frame adapted to completely rotate thereon, said receptacle being provided with a water tight partition wall extending from end to end in its interior, parallel with the longitudinal axis of said receptacle and positioned at a substantial right angle with the axis of rotation of said receptacle.

5. In a dish-washing machine, a supporting frame, a dish supporting receptacle rotatably mounted thereon on a horizontal axis, said receptacle being provided with a vertical water tight partition positioned perpendicular to the axis of rotation within the receptacle providing separate, water tight compartments therein, said receptacle being provided at the inside of its side walls with vertically extending corrugations, and a plurality of removable foraminous partitions provided with dish positioning means at their sides positioned within the compartments of said receptacle and retained in position therein by means of the vertically extending corrugations at the side walls of said receptacle and in said partition, the side walls of said partition being provided with vertical corrugations.

6. In a dish-washing machine, a supporting frame, and a long receptacle rotatably mounted intermediate its ends on a horizontal axis on said frame provided with a plurality of partition walls, the side walls of said receptacle and said partition walls being provided with transverse corrugations covering the whole inner side of said receptacle and adapted to space dishes within said receptacle from each other.

7. In a dish-washing machine, a supporting frame, a long receptacle rotatably mounted intermediate its ends on a horizontal axis on said frame, a water tight partition, the side walls of said receptacle and said partition being provided with vertical corrugations adapted to space dishes within said receptacle from each other, and a plurality of removable foraminous partitions positioned within the separate compartments of said receptacle and retained in position therein by means of the corrugations in the side walls of said receptacle and the corrugations in said partition.

8. In a dish-washing machine, a supporting frame, a long receptacle rotatably mounted intermediate its ends on a horizontal axis on said frame, provided with a longitudinal water tight partition, the side walls of said receptacle and said partition being provided with vertical corrugations adapted to space dishes within said receptacle from each other, and a plurality of removable foraminous partitions positioned within the separate compartments of said receptacle and retained in position therein by means of the corrugations in the side walls of said receptacle and the corrugations in said partition, said removable partitions being also provided with vertical corrugations at their sides for the reception of the edges of dishes positioned in the receptacle.

9. In a dish-washing machine, a receptacle rotatably mounted on a horizontal axis, said receptacle divided by a partition into a plurality of relatively long, narrow compartments perpendicular to the axis of rotation, each compartment provided with outwardly converging walls, a water tight cover for said receptacle and yieldable means on the inner wall of said cover in each of said compartments adapted to engage the varying positioned edges of dishes and hold them in position while the receptacle rotates.

10. In a dish-washing machine, a receptacle rotatably mounted on a horizontal axis, said receptacle divided by a partition into a plurality of relatively long, separate, narrow, water tight compartments perpendicular to the axis of rotation, each compartment provided with outwardly converging walls, said walls provided with vertical grooves adapted for receiving dish spacing partitions, a water tight cover for said receptacle, and yieldable means on the inner wall of said cover in each of said compartments adapted to engage the varying positioned edges of the dishes and hold them in position while the receptacle rotates.

11. In a disk and cooking utensil washer, a receptacle rotatably mounted on a horizontal axis adapted to rotate thereon, provided with a partition forming relatively long compartments perpendicular to the axis of rotation each compartment provided with angular, corrugated side walls, a water tight cover the full length of said receptacle and yieldable means on the inner wall of said cover in each of said compartments adapted to engage the varying positioned edges of dishes and cooking utensils and hold them in position while the receptacle rotates.

In testimony whereof, I have hereunto set my hand at San Diego, California, this 14th day of August, 1924.

ABRAM B. BOWMAN.